United States Patent [19]

Takada et al.

[11] Patent Number: 5,484,882
[45] Date of Patent: Jan. 16, 1996

[54] PROCESS FOR THE CONTINUOUS PRODUCTION OF BIODEGRADABLE POLYESTER POLYMER

[75] Inventors: Morio Takada; Yasutoshi Kakizawa, both of Chiba, Japan

[73] Assignee: Dainippon Ink and Chemicals, Inc., Tokyo, Japan

[21] Appl. No.: 272,191

[22] Filed: Jul. 8, 1994

[30] Foreign Application Priority Data

Jul. 12, 1993 [JP] Japan .................................. 5-171517

[51] Int. Cl.$^6$ ................................. C08G 63/08; C08F 6/00
[52] U.S. Cl. .......................... 528/361; 528/272; 528/354; 528/357; 528/480
[58] Field of Search ................................. 528/480, 361, 528/354, 357, 272

[56] References Cited

U.S. PATENT DOCUMENTS

| | | | |
|---|---|---|---|
| 4,789,726 | 12/1988 | Hutchinson | 528/354 |
| 5,007,923 | 4/1991 | Bezwada et al. | 528/354 |
| 5,041,529 | 8/1991 | Shinoda et al. | 528/354 |
| 5,225,129 | 7/1993 | Van den Berg | 528/357 |
| 5,256,762 | 10/1993 | Hermes et al. | 528/357 |
| 5,288,841 | 2/1994 | Bellis et al. | 528/354 |
| 5,302,694 | 4/1994 | Buchholz | 528/354 |
| 5,310,599 | 5/1994 | Ford | 528/354 |
| 5,310,865 | 5/1994 | Enomoto et al. | 528/354 |
| 5,378,801 | 1/1995 | Reichert et al. | 528/354 |

OTHER PUBLICATIONS

Kirk–Othmer's Encyclopedia of Chemical Science & Technology, vol. 9, p. 311 "Esters, Organic".

*Primary Examiner*—P. Hampton-Hightower
*Attorney, Agent, or Firm*—Armstrong, Westerman, Hattori, McLeland & Naughton

[57] ABSTRACT

The present invention provides a process for the continuous production of a biodegradable polyester polymer with an excellent quality useful in the field of medicine, coating material and packaging material by eliminating difficulty in uniform agitation and heat removal caused by the rise in the viscosity of reactants in the production of a high molecular biodegradable polyester polymer by ring-opening polymerization. In some detail, the present invention provides a process for the continuous production of a biodegradable polyester polymer having a melt viscosity of not more than 500,000 poise and a weight-average molecular weight of not less than 10,000, which comprises continuously supplying monomers or polymers selected from the group consisting of intermolecularly cyclized ester of hydroxycarboxylic acid, lactone, and polymer having hydroxyl group and/or ester bond into a continuous reaction apparatus equipped with a static mixer where the reactants are subjected to continuous polymerization reaction at a polymerization temperature of 125° to 270° C., a maximum system reaction pressure of 2 to 15 Kg/cm$^2$ and a conversion (one pass) of not less than 85% in the presence or absence of solvent without coming into contact with oxygen and water in the atmosphere, and then subjected to devolatilization to remove and recover residual monomers and solvent for reuse.

17 Claims, 4 Drawing Sheets

PROCESS FOR THE CONTINUOUS PRODUCTION OF BIODEGRADABLE POLYESTER POLYMER

FIELD OF THE INVENTION

The present invention relates to an excellent continuous production process which can provide a biodegradable polyester polymer useful in the field of medical organism-absorbing material, material for medicines or agricultural chemicals such as capsule, coating material, packaging material such as sheet and film, lamination, etc. on an industrial basis without having any thermal decomposition due to difficulty in uniform agitation caused by the rise in the viscosity of starting materials or any quality drop of the resulting polymer due to coloring in the production of a biodegradable polyester polymer, particularly a lactide as a bimolecular cyclized ester, i.e., dilactide (e.g., lactide, 1.4-dioxa-3,6-dimethylcyclohexane-2,5-dione), diglycolide (e.g., glycolide, 1,4-dioxa-cyclohexane-2,5-dione), lactone or copolymer thereof.

BACKGROUND OF THE INVENTION

A polyester polymer such as intermolecularly cyclized ester, e.g., dilactide and diglycolide, monomolecularly cyclized ester, e.g., lactone, and copolymer thereof (hereinafter simply referred to as "polyester polymer") undergoes decomposition by light, heat, oxygen or the like to enter into the natural reduction cycle. Thus, it has recently been the target of studies for use as a biodegradable polymer material from the standpoint of safety and prevention of global environmental pollution.

The process for the production of a homopolymer of dilactide or diglycolide as an intermolecularly cyclized eater can be roughly divided into two known groups.

One of the two processes comprises direct dehydropolycondensation of the corresponding hydroxycarboxylic acid to obtain a polymer. The other comprises the synthesis of a dehydrated cyclic ester of hydroxy acid known as an example of dilactide or diglycolide, and then the ring-opening polymerization of the ester to obtain a polymer.

In the former direct polycondensation process, it is difficult to obtain a polymer having a molecular weight of not less than 4,000 (as described in C. H. Halten, "Lactic Acid", page 226, Verlag Chemie, 1971). Even if the reaction conditions are improved in an attempt to increase the high molecular amount of the polymer, the limit of the molecular weight is about 20,000 as described in JP-B-2-52930 (The term "JP-B" as used herein means an "examined Japanese patent publication"). If a polymer having a higher molecular weight is required to be prepared, the latter ring-opening polymerization of cyclic esterified product has been heretofore used.

Referring to the process for the continuous production of these lactides or lactones, processes for the continuous production of aromatic polyesters and lactones are disclosed in JP-A-61-281124 (The term "JP-A" as used herein means an "unexamined published Japanese patent application"), JP-A-61-283619, JP-A-61-287922, JP-A-62-20525, JP-A-60-27425, JP-A-2-302428, JP-A-2-302429, JP-A-2-302433 and JP-A-2-302434, In these processes, the reaction vessel comprises screw or paddle agitating blades as used in kneader or extruder incorporated therein. In this arrangement, the reaction system is agitated by the agitator while the reactants are sequentially moved from the intake port to the product outlet.

Referring to the process for the continuous production of lactides, JP-A-5-93050 discloses a so-called CSTR continuous production process which comprises continuously supplying starting materials into a series combination of a plurality of agitating tanks so that they are subjected to continuous polymerization for a retention time between the first reaction tank and the final reaction tank as reaction time. However, all the above cited processes are operated by reaction apparatus equipped with dynamic agitators, and the foregoing patents give no disclosure or suggestion of solution to difficulty in uniform agitation and heat removal caused by the rise in the viscosity of the reactants in the continuous production of a biodegradable polyester polymer having a high molecular weight from lactides or lactones.

In some detail, if the processes for the production of lactides as disclosed in the above cited patents and references are tried, it can be found that as the average molecular weight of the polymer thus produced rises, the polymer viscosity rises to as very high as 10,000 to several hundreds of thousands of poise, making it difficult to agitate the reactants by an ordinary agitator, even to withdraw the reactants. Even if a powerful agitator is used and an elaborate agitating blade is used to agitate the reaction system, the reactants move only in a substantially laminar flow according to the rotation of the agitating blade, making it difficult to homogeneously agitate the entire reaction system.

Further, since the ring-opening polymerization of cyclic esters involves heat generation, the resulting rise in the viscosity of the reactants gives difficulty in uniform agitation that makes it difficult to control the temperature in the reaction tank. This makes the reaction out of control or gives a distribution of temperature in the polymer, causing local heating that deteriorates the polymer quality.

In particular, these biodegradable polyester polymers prepared from cyclic esters have an excellent biodegradability but easily undergo hydrolysis by acid, alkali or water and liable to drop of molecular weight due to heat. For example, GUPTA M. C., "Colloid Polymer Science" DEU, 260 (3), 308–311, 1982, reports studies of the thermal decomposition rate of a homopolymer of dilactide by TGA (thermogravimetric analysis). However, an accelerated drop of molecular weight takes place at a temperature as high as not lower than 250° C. even in a sealed reaction vessel.

In addition, the homopolymer or copolymer of dilactide is also liable to coloring upon exposure to high temperature. That is, the conventional process for the continuous production of polymers from cyclic esters is disadvantageous in that the rise in the viscosity of the polymer caused by the rise in the molecular weight of the polymer prevents uniform mixing, resulting in local heating that causes partial modification and hence quality drop. Accordingly, setting aside small scale laboratory experiments, an improved process for the mass production of a biodegradable polyester polymer on an industrial basis has been desired.

SUMMARY OF THE INVENTION

It is therefore an object of the present invention to provide a process for the continuous production of a biodegradable polyester polymer with an excellent quality on an industrial basis by eliminating the difficulty in uniform mixing and removal of heat due to the rise in the viscosity of the reactants that occurs in the production of a biodegradable polyester polymer having a high molecular weight on an industrial basis.

The foregoing and other objects of the present invention will be more apparent from the following detailed description and examples.

In view of the foregoing difficulties, the inventors made extensive studies of the method of stirring and heading a biodegradable polyester polymer and the process for the continuous production thereof. As a result, it has been found that the use of a continuous reaction apparatus equipped with a static mixer enables a satisfactory mixing of the reactants and an efficient removal of polymerization heat in spite of high viscosity of polymerization fluid to produce a polymer having a high molecular weight with a high quality at a high efficiency without any decomposition or coloring. Thus, the present invention has been worked out.

The present invention provides a process for the continuous production of a biodegradable polyester polymer, which comprises continuously supplying an intermolecularly cyclized ester of hydroxycarboxylic acid and one or more lactones into a continuous reaction apparatus equipped with a static mixer so that they undergo ring-opening polymerization. In the foregoing continuous production process, the reaction my be effected with a solvent in an amount of not more than 20 parts by weight based on 100 parts by weight of polymerizable components. In particular, the intermolecularly cyclized ester of hydroxycarboxylic acid may be a dilactide and/or diglycolide.

The present invention also provides a process for the continuous production of a biodegradable polyester polymer, which comprises allowing an intermolecularly cyclized ester of hydroxycarboxylic acid and one or more lactones to undergo polymerization in a stirring reaction vessel equipped with an agitator, and then further causing the polymerization reaction to proceed in tho continuous reaction apparatus equipped with a static mixer or a process for the continuous production of a biodegradable polyester polymer, which comprises allowing the reactants to be circulated and polymerized in a loop continuous reaction apparatus equipped with a static mixer, wherein the starting materials to be polymerized are supplied into the continuous reaction apparatus equipped with a static mixer in the form of melt or solution in a solvent prepared in an atmosphere of an inert gas.

The present invention further provides a process for the production of a biodegradable polyester polymer, which comprises polymerizing an intermolecularly cyclized ester of hydroxycarboxylic acid and one or more lactones in the continuous reaction apparatus equipped with a static mixer, and subsequently removing and recovering the residual monomers and/or solvents from the resulting polymer in a devolatilizer connected to the continuous reaction apparatus equipped with a static mixer, whereby the monomers and solvents thus recovered can be re-used.

The present invention further provides a process for the production of a biodegradable polyester polymer, which comprises continuously supplying a dilactide and a diglycolide into a continuous reaction apparatus equipped with a static mixer so that they undergo ring-opening polymerization, wherein the reaction may be effected with a solvent in an amount of not more than 20 parts by weight based on 100 parts by weight of polymerizable components. In particular, the continuous production process may comprise polymerizing a dilactide and a diglycolide in a stirring reaction vessel equipped with an agitator, and then further causing the polymerization reaction to proceed in the continuous reaction apparatus equipped with a static mixer. Alternatively, the continuous production process may comprise causing the reactants to be circulated and polymerized in a loop continuous reaction apparatus equipped with a static mixer.

In the foregoing continuous production process, the starting materials to be polymerized may be supplied into said continuous reaction apparatus equipped with a static mixer in the form of melt or solution in a solvent prepared in an atmosphere of an inert gas. In particular, the polymerization in the continuous reaction apparatus equipped with a static mixer may be followed by the removal and recovery of residual monomers and/or solvents from the resulting polymer in a devolatilizer connected to the continuous reaction apparatus equipped with a static mixer, whereby the monomers and solvents thus recovered can be reused.

The present invention further provides a process for the continuous production of a biodegradable polyester polymer, which comprises continuously supplying one or more lactones into a continuous reaction apparatus equipped with a static mixer so that they undergo ring-opening polymerization. In the foregoing continuous production process, the reaction may be effected with a solvent in an amount of not more than 20 parts by weight based on 100 parts by weight of polymerizable components. In particular, the foregoing continuous production process comprises polymerizing one or more lactones in a stirring reaction vessel equipped with an agitator, and then further causing the polymerization reaction to proceed in the continuous reaction apparatus equipped with a static mixer. The reactants may be circulated and polymerized in a loop continuous reaction apparatus equipped with a static mixer. Further, the starting materials to be polymerized may be supplied into the continuous reaction apparatus equipped with a static mixer in the form of melt or solution in a solvent prepared in an atmosphere of an inert gas. Alternatively, the polymerization in the continuous reaction apparatus equipped with a static mixer may be followed by the removal and recovery of residual monomers and/or solvents from the resulting polymer in a devolatilizer connected to the continuous reaction apparatus equipped with a static mixer, whereby the monomers and solvents thus recovered can be used.

The present Invention further provides a process for the continuous production of a biodegradable polyester polymer, which comprises continuously supplying one or more intermolecularly cyclized esters of hydroxycarboxylic acid and one or more polymers having hydroxyl group and/or ester bond into a continuous reaction apparatus equipped with a static mixer so that they undergo copolymerization. In the foregoing continuous production process, the reaction may be effected with a solvent in an amount of not more than 20 parts by weight based on 100 parts by weight of polymerizable components. In particular, the intermolecularly cyclized ester of hydroxycarboxylic acid may be a dilactide and/or diglycolide. Further, the foregoing continuous production process may comprise polymerizing one or more intermolecularly cyclized esters of hydroxycarboxylic acid and one or more polymers having hydroxyl group and/or ester bond in a stirring reaction vessel equipped with an agitator, and then further causing the polymerization reaction to proceed in the continuous reaction apparatus equipped with a static mixer. Alternatively, the reactants may be circulated and polymerized in a loop continuous reaction apparatus equipped with a static mixer. Further, the starting materials to be polymerized may be supplied into the continuous reaction apparatus equipped with a static mixer in the form of melt or solution in a solvent prepared in an atmosphere of an inert gas. Moreover, the polymerization in the continuous reaction apparatus equipped with a static mixer may be followed by the removal and recovery of residual monomers and/or solvents from the resulting polymer in a devolatilizer connected to the continuous reaction apparatus equipped with a static mixer, whereby the monomers and solvents thus recovered can be re-used.

BRIEF DESCRIPTION OF THE DRAWINGS

By way of example and to make the description more clear, reference is made to the accompanying drawings in which.

DETAILED DESCRIPTION OF THE INVENTION

Figure 1:
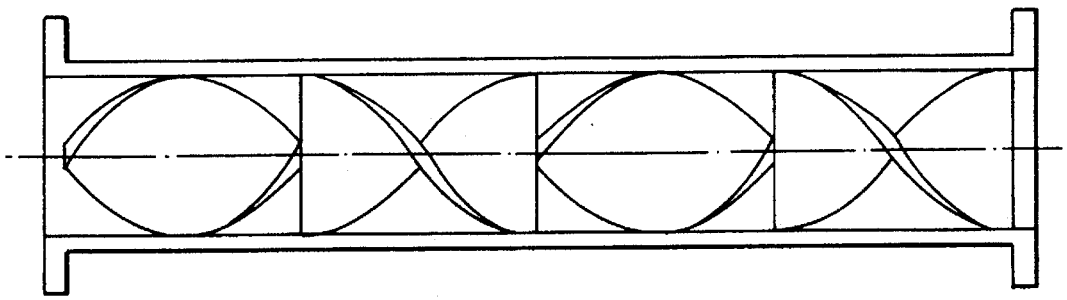
FIG. 1 is a diagram illustrating a Kenics static mixer as an embodiment of the static mixer which can be used in the present invention.

The continuous reaction apparatus used herein will be further described hereinafter.

The "static mixer" as defined herein refers to a static mixer free of mobile portion, i.e., agitator as opposed to a mixer equipped with an agitator. More particularly, it refers to a mixer comprising mobile portion-free mixing elements fixed in a pipe through which the solution flow is axially and crosswise split, diverted or inverted so that the solution is stirred. Some static mixers are equipped with a jacket for heat exchange on the periphery of the pipe. Some static mixers are provided with a tube through which a heat medium for heat exchange flows in the mixing elements. In the present invention, the solution as starting material is pumped into the static mixer which is then used as a reaction apparatus. The static mixer is also used to stir the starting materials or the resulting polymer in the present invention.

The production of the present heat-decomposable biodegradable polyester polymer involves vigorous generation of agitation heat due to agitation shearing stress, not to mention polymerization heat, in a resin viscosity range as high as more than 10,000 poise. Thus, if the dynamic agitation process is employed, it is liable to vigorous local generation of heat in the agitation area. Therefore, a uniform-working static mixer which gives a small shearing stress is particularly preferred.

The static mixer is normally tubular. A plurality of such static mixers can be connected in series. In such an arrangement, the starting materials can be continuously supplied into the static mixer through an intake in an atmosphere of an inert gas so that the reactants move continuously through the static mixer, whereby the reaction can continuously occur, including charging of starting materials, reaction, devolatilization of polymer, recovery of unreacted monomer and/or solvent and pelletization of polymer, without causing the reactants to come into contact with the atmosphere.

This is an advantage which cannot be given by the conventional batch reaction apparatus. The production process of the present invention is extremely suitable for the production of a degradable polymer which undergoes decomposition by oxygen, water, or light depending on the kind of polymer. In some detail, in the dynamic agitation process, if the agitation power is increased to raise the uniformity in mixing of the high viscosity polymer, the agitation heat is increased, keeping the decomposition of the polymer in progress. In the present invention, the foregoing problem can be solved by the use of a static mixing process.

The static mixer comprising a plurality of mobile portion-free mixing elements fixed therein as used herein may be externally provided with a heat exchanger to control the temperature in the reaction vessel. Further, a medium can be passed through the mixing elements so that a wider heat exchanging area can be given to control the temperature in the reaction apparatus more efficiently.

Examples of preferred static mixers employable in the present invention include. Sulzer static mixer, Kenics static mixer and Toray static mixer. For the production of a polymer which is liable to high polymerization heat, particularly a biodegradable polyester polymer having a high viscosity, a Sulzer static mixer of SMR type comprising mixing elements having a medium passage for heat exchange incorporated therein is particularly preferred.

Figure 2:
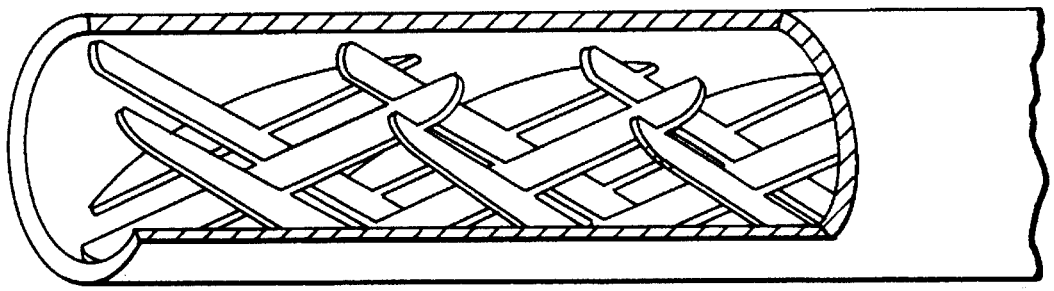
FIG. 2 is a diagram illustrating a Sulzer static mixer of SMXL type as an embodiment of the static mixer which can be used in the present invention.
Figure 3:
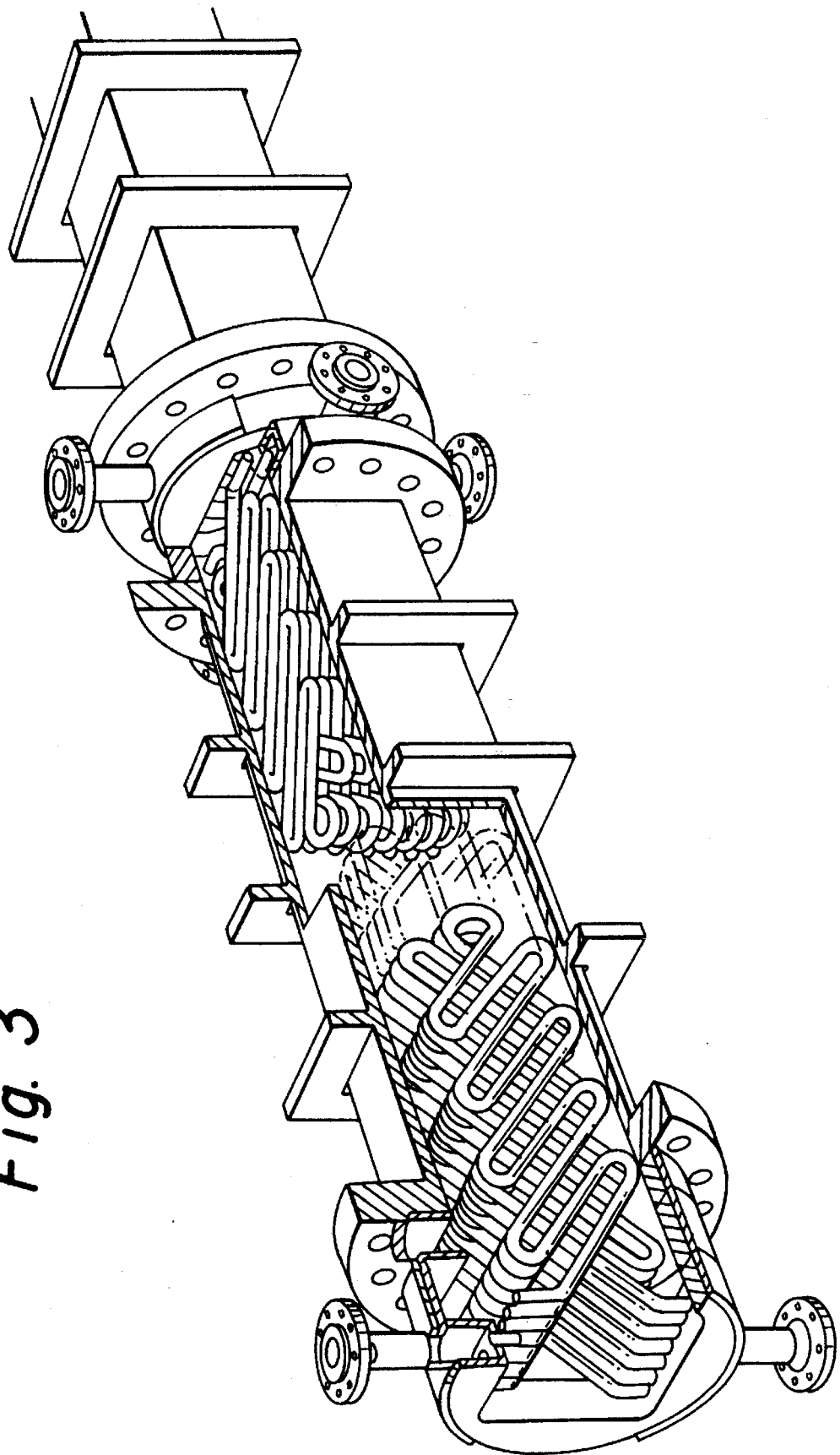
FIG. 3 is a diagram illustrating a Sulzer static mixer of SMR type as an embodiment of the static mixer which can be used in the present invention.

FIG. 1 shows a Kenics static mixer. FIG. 2 shows a Sulzer static mixer of SMXL type. FIG. 3 shows a Sulzer static mixer of SMR type. In the Kenics static mixer shown in FIG. 1, one static mixer unit is provided with four mixing elements.

Figure 4:
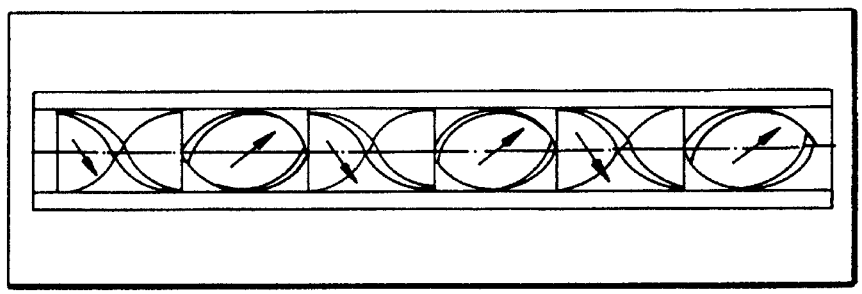
FIG. 4 is a diagram illustrating the relationship between the number of mixing elements and the number of divide in a static mixer.
Figure 5:
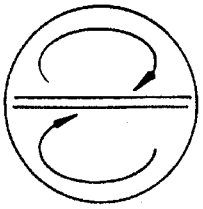
FIG. 5 is a diagram illustrating the effect of inversion of flow in a Kenics static mixer.
Figure 6:
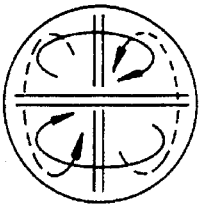
FIG. 6 is a diagram illustrating the effect of diversion of flow in a Kenics static mixer.

Referring to the Kenics static mixer, the principle of mixing by the static mixer will be described hereinafter. FIG. 4 shows the relationship between the number of mixing elements and the number of divide of flow. Assuming that the number of mixing elements is n, the total number S of divide of flow is represented by the equation $S=2^n$. The thickness d of the flow layer is represented by the equation $d=D/2^n$ where D is the inner diameter of the static mixer tube. FIGS. 5 and 6 illustrate the effects of inversion and diversion in the Kenics static mixer.

The more the total number of divide is, that is, the more the number of miming elements is, the more uniform is mixing. However, the more the number of mixing elements is, the more is the pressure loss in the apparatus. This is economically disadvantageous. Therefore, the number of mixing elements to be used should be predetermined as small as possible so far as sufficient mixing effect can be provided.

The mixing efficiency is proportional to the linear speed of the fluid. The number of mixing elements that exerts a sufficient mixing effect is determined by the viscosity of the reaction solution. In general, Reynolds number of the reaction solution in the static mixer ($Re=DU\rho/\mu$ wherein D is the inner diameter (cm) of the tube, U is the flow rate (cm/sec) in the tube, $\rho$ is the density (g/cm$^3$) of the reaction solution, and $\mu$ is the viscosity (g/cm.sec) of the reaction solution) is preferably not less than $10^3$.

However, since the present invention is intended for polymerization reaction with an extremely high viscosity, the effect of inversion and diversion of flow in the static mixer is rather important in the present invention. Therefore, it is not necessarily required that the number of mixing elements in the static mixer be predetermined such that Reynolds number is not less than $10^3$. Thus, the number of mixing elements depends on the type of the static mixer used. Accordingly, the number of mixing elements in the static mixer used in the present invention is not specifically limited. In general, 5 to 40 units are preferably combined. More preferably, 10 to 25 units are combined.

The arrangement according to the present invention employing the continuous reaction apparatus equipped with a static mixer can have various embodiments depending on the properties of the polymer to be prepared. In some detail, all the polymerization reactions can be effected only by a reaction apparatus equipped with a static mixer. However, since the static mixer exerts its agitation effect remarkably in the latter half of the reaction during which the polymer becomes more viscous, it is also possible that the reaction be effected in a reaction vessel equipped with an ordinary agitator in the initial stage during which the polymer viscosity is relatively low and then in a reaction apparatus equipped with a static mixer in the latter polymerization stage during which the polymer viscosity is higher.

Therefore, the present invention may be implemented by the use of a continuous reaction apparatus comprising an agitation reaction vessel and a reaction apparatus equipped with a static mixer sequentially connected to each other.

In the case where the polymerization gives a low polymer viscosity but involves a vigorous generation of heat in the initial stage of polymerization, the reaction is preferably effected by means of a sequential continuous reaction apparatus equipped with a static mixer, more preferably a loop continuous reaction apparatus equipped with static mixers connected in a loop (hereinafter occasionally referred to as "loop circulation polymerization line or loop reaction zone").

Figure 7:
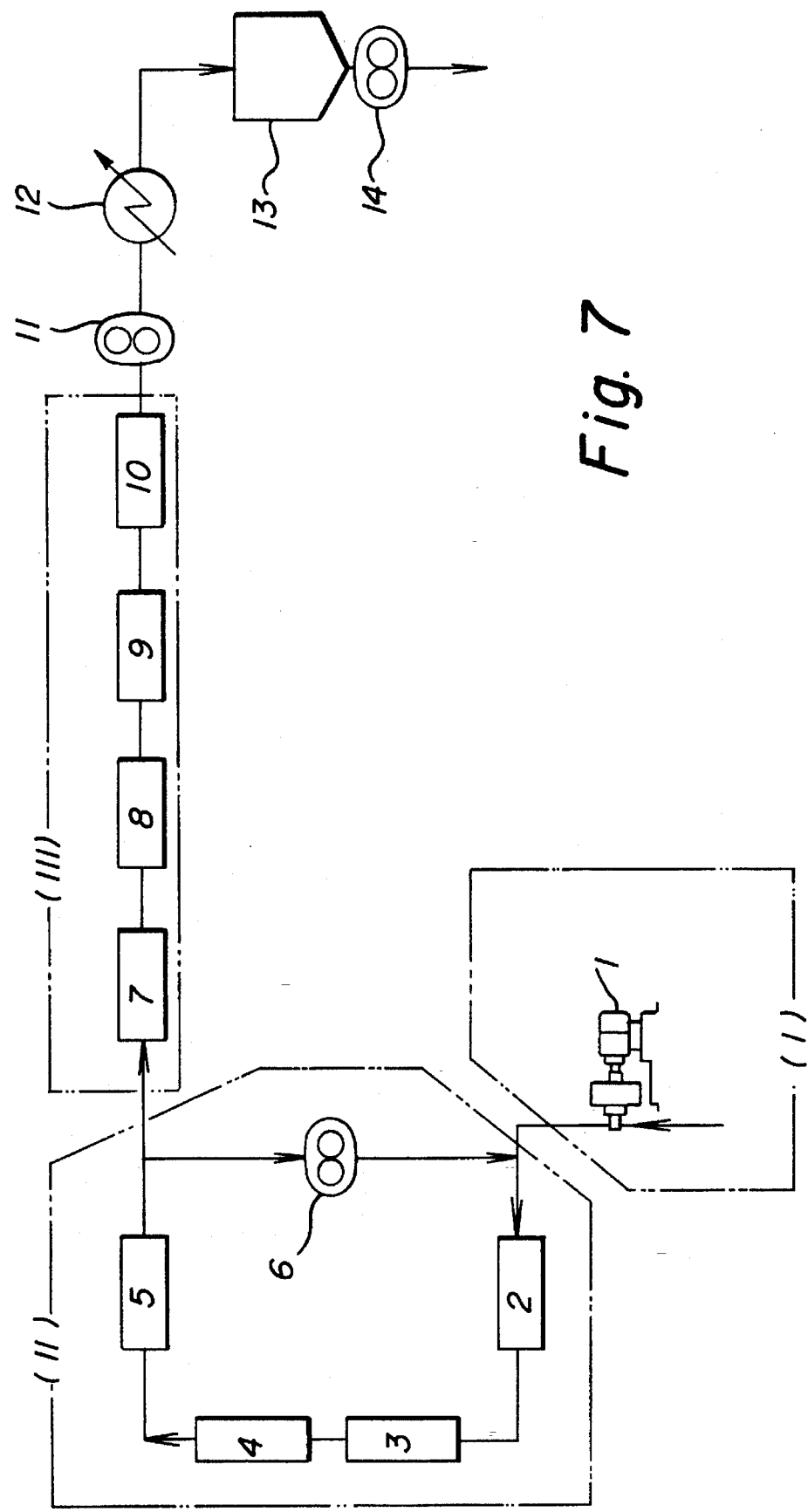
FIG. 7 is a diagram illustrating an example of the configuration of a continuous polymerization apparatus for biodegradable polyester polymers according to the present invention, wherein the reference number 1 indicates a plunger pump, the reference numbers 2, 3, 4, 5, 7, 8, 9 and 10 each indicate a static mixer, the reference numbers 6, 11 and 14 each indicate a gear pump, the reference number 12 indicates a heat exchanger, the reference number 13 indicates a devolatilizer, the reference number I indicates a starting material supply system, the reference number II indicates a circulation polymerization line, and the reference number III indicates a non-circulation polymerization line.

In some detail, the polymerization solution which has undergone reaction in the tubular continuous reaction apparatus equipped with a static mixer may be preferably recycled to the reaction apparatus in a loop rather than withdrawn from the reaction apparatus after one pass so that the polymerization solution is cooled by and mixed with the reactants in the polymerization zone having a high reaction heat and then allowed to undergo further polymerization in the continuous polymerization line equipped with a static mixer connected to the loop circulation polymerization line. FIG. 7 shows an embodiment of the structure of the foregoing continuous polymerization apparatus.

The material supplying rate, i.e., linear velocity of the reactant is a factor that directly affects the mixing efficiency and cooling efficiency. Therefore, the linear velocity of the reactant is properly selected depending on the polymerization degree, viscosity and calorific value of the polymer to be produced. The starting materials to be polymerized in the present invention are biodegradable or hydrolyzable. In order to inhibit the decomposition of the starting materials by oxygen or water, monomers or polymers as starting materials having a lower melting point or softening point may be melted at a temperature of not lower than the melting point or softening point while other monomers and/or polymer having a higher melting point or softening point may be dissolved before being supplied into the continuous reaction apparatus equipped with a static mixer, in a flow of an inert gas such as nitrogen gas. Alternatively, these monomers and/or polymers as starting materials may be supplied into the continuous reaction apparatus equipped with a static mixer in a flow of an inert gas.

In the present invention, the mass polymerization of polymerizable components comprising reactive monomers and/or polymers may be effected in the absence of solvent in the reaction apparatus equipped with a static mixer. However, the polymerization reaction may be effected in the presence of a solvent that has no adverse effects on the polymerization reaction for the purpose of controlling the viscosity of the reaction solution.

The reaction system with such a solvent can produce a low viscosity that involves a reduced shear, resulting in a further enhancement of uniform mixing and reduction in the number of mixing elements used in the reaction apparatus. Thus, the pressure under which the flow rate necessary for mixing can be obtained can be reduced, minimizing the entire pressure resistance of the reaction apparatus.

As the solvent to be added to the reaction system there may be used any solvent so far as it does not react with the monomers and/or polymers as starting materials, exhibits a strong dissolving power with respect to these monomers and/or polymers and can be easily recovered for reuse. In some detail, toluene, xylene, ethylbenzene, etc. may be preferably used.

The amount of the solvent to be added to the reaction system is preferably in the range of not more than 20 parts by weight based on 100 parts by weight of polymerizable components comprising these monomers and/or polymers as starting materials or such that the maximum viscosity of the reaction solution throughout the entire reaction is adjusted to 50,000 poise. In this range of solvent content, the reaction rate cannot be drastically affected, and the molecular weight of the resulting polymer is not reduced.

However, the "amount of solvent" as defined herein means the amount of solvent in the steady state in the continuous reaction. In the initial stage of the continuous reaction according to the present invention, the amount of solvent to be added to the reaction system is in the range of not less than 20 parts by weight based on 100 parts by weight of polymerizable components comprising monomers and/or polymers as starting materials. The reaction system is diluted with the solvent before the initiation of the polymerization reaction so that it does not involve any sudden polymerization reaction. Thereafter, the proportion of polymerizable components comprising monomers and/or polymers as starting materials and the reaction temperature are gradually and carefully raised to initiate the polymerization reaction.

Accordingly, the "amount of solvent of not more than 20 parts by weight based on 100 parts by weight of polymerizable components comprising monomers and/or polymers as starting materials" as defined herein indicates the amount of solvent to be added to the reaction system in the steady continuous reaction state.

The time at which the solvent is added to the reaction system may be at the stage of charging of starting materials. Alternatively, since the static mixer has an extremely good mixing capacity that enables an easy uniform mixing of a high viscosity solution with a solvent, the solvent may be added to the reaction system for the purpose of cooling the reaction system in the polymerization stage at which the generation of reaction heat is vigorous.

Further, the solvent may be added to the reaction system at the time when the viscosity of the reaction solution is increased to an extremely high value by the resulting polymer having a high molecular weight in the latter polymerization stage. Alternatively, in the case where the solvent is added to the reaction system in the course of reaction, monomers and/or polymers as starting materials may be dissolved in the solvent before it is added to the reaction system. Further, other additives such as molecular weight modifier, plasticizer and oxidation inhibitor may be added to the solvent before it is added to the reaction system.

The system pressure in the polymerization reaction of the biodegradable polyester polymer with such a solvent added thereto in the continuous reaction apparatus equipped with a static mixer depends on the kind of monomers and/or polymers as starting materials. In general, it is in the range of 2 to 15 Kg/cm$^2$, normally not more than 10 Kg/cm$^2$. The retention time (reaction time) in the polymerization reaction system is normally between 1 hour and 8 hours. In the final stage of continuous reaction, the solvent proportion is gradually raised, and the reaction is suspended while the resulting polymer and unreacted monomers and/or polymers as starting materials are withdrawn from the reaction system.

In this stage, the solvent proportion is deviated from the range in the steady state and in the range of not less than 20 parts by weight. In the case where the reaction is effected free of solvent, the reaction temperature at the initial stage is predetermined at a low value. The resulting polymer is recycled to the intake without being withdrawn from the continuous reaction apparatus. Thus, the monomers and/or polymers as starting materials are circulated in the reaction apparatus several times. The reaction temperature is then gradually raised to effect polymerization reaction.

The percent conversion in the continuous reaction apparatus equipped with a static mixer according to the present invention may be at least 85%. Other unreacted monomers may be recovered by a devolatilizer and then reused as starting materials. The monomers thus recovered may be subsequently recharged into the starting material tank or stored in a cushion tank from which they are then supplied into the starting material tank where they are mixed with fresh monomers as starting materials for reaction.

Even if the percent conversion is not less than 85%, the residual monomers are reactive. If these monomers remain in the finished polymer product, they affect the storage stability thereof. Further, residual monomers and oligomers disadvantageously harm and stink to human being and thus are preferably removed.

Therefore, in combination with the recovery and recycling of unreacted monomers, the polymerization of a polyester polymer in the continuous reaction apparatus is followed by the separation and recovery of residual monomers, oligomers or solvent from the resulting polymer in a devolatilizer connected to the continuous reaction apparatus in order to improve the physical properties of the polymer. The solvent thus recovered is separated from the monomers thus recovered, and then stored in a storage tank for reuse as necessary.

In a specific embodiment of the devolatilization method, the resulting polymer from the polymerization reaction is heated and melted by a preheater connected to the continuous reaction apparatus equipped with a static mixer for the purpose of providing the polymer with a sufficient fluidity and a heat corresponding to the evaporation latent heat of the devolatilized material. In this case, as a heat exchanger there may be used a vertical shell-and-tube heat exchanger or a static mixer equipped with a heat exchanger.

The devolatilizer for implementing the present invention may comprise a simple flush tank to effect devolatilization. In this vertical single-stage devolatilization apparatus, devolatilization can be effected at the vaporization temperature of the residual monomers and/or solvent. However, devolatilization is preferably effected by means of a two-stage devolatilization tank in the present invention. In some detail, devolatilization is effected in vacuo, i.e., under reduced pressure of 20 to 150 mmHg in the first stage devolatilizer and then at a higher vacuum degree, i.e., under reduced pressure of 1 to 20 mmHg in the second stage devolatilizer to separate and recover unreacted monomers. As the vacuum chamber there may be used a commonly used apparatus. For example, a flush devolatilizer or thin film type devolatilizer may be used.

The polymer thus devolatilized may be withdrawn through the bottom of the devolatilizer by means of a gear pump, and then pelletized. Alternatively, the polymer may be extruded as a plurality of linear polymers having a diameter of 0.3 to 3 mm by means of a vented extruder, and then subsequently supplied into a devolatilizer for devolatilization. The polymer thus devolatilized may be withdrawn by means of a gear pump, and then pelletized as it is or after being mixed with additives through an extruder or static mixer as necessary. Further, unreacted monomers may be cooled and recovered by means of a condenser so that it can be again subjected to reaction together with fresh monomers as starting materials. After the continuous reaction reached a steady state, the unreacted monomers thus recovered are continuously recycled to the starting material tank so that they are continuously reused for reaction. After being cooled and recovered in the condenser, the solvent thus separated and recovered is stored in the solvent tank so that it is reused as necessary. If a polymer is used as a starting reaction material, the proportion of monomer as starting material in polymer as starting material is preferably increased, and unreacted monomers are then preferably recovered and reused, in order to prevent unreacted polymer from entering into the resulting polymer.

In the present invention, the content of residual monomers in the polyester polymer thus prepared can be reduced to not more than 1% by the continuous use of the devolatilizer.

The polymerizable components of the biodegradable polyester polymer to be used in the present invention will be further described hereinafter. The term "intermolecularly cyclized ester of hydroxycarboxylic acid" as used herein means a product obtained by the dehydration and cyclic esterification of two hydroxycarboxylic acid molecules. Examples of such an intermolecularly cyclized ester include intermolecularly cyclized ester of lactic acid, glycolic acid, ethylglycolic acid and dimethylglycolic acid represented by the general formula (I) such as diglycolide, dilactide, diethyl glycolide, methyl glycolide, α,α-dimethyl glycolide, trimethyl glycolide and tetramethyl glycolide,

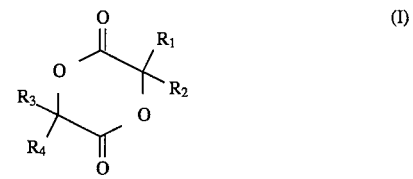

(I)

wherein $R_1$, $R_2$, $R_3$ and $R_4$ may be the same or different and each represent a hydrogen atom, methyl group or ethyl group, L-dilactide and D-dilactide obtained by the cyclic esterification of L-lactic acid and D-lactic acid, respectively, D,L-dilactide obtained by the cyclic esterification of two D,L-lactic acids, dilactides such as MESO-dilactide obtained by the cyclic esterification of one L-lactic acid molecule and one D-lactic acid molecule, and intermolecularly cyclized esters of hydroxy acids such as α-hydroxyacetic acid, α-hydroxybutyric acid, α-hydroxyisobutyric acid, α-hydroxyvaleric acid, α-hydroxyisovaleric acid, α-hydroxycaproic acid, α-hydroxyisocaproic acid, α-hydroxy-a-ethylbutyric acid, α-hydroxy-β-methylvaleric acid, α-hydroxyheptoic acid, α-hydroxyoctoic acid, α-hydroxydecanoic acid, α-hydroxymyristic acid and α-hydroxystearic acid.

The intermolecularly cyclized esters to be used in the present invention may be selected depending on the properties of the desired polymer. Two or more intermolecularly cyclized esters may be used in combination. For example, even if a dilactide is used as a copolymer of dilactide and diglycolide, L-dilactide or D-dilactide should not be simply used as a dilactide, but two or more selected from the group consisting of L-dilactide, D-dilactide, D,L-dilactide and MESO-dilactide should rather be used in combination with a diglycolide to provide a further improvement in the resin properties such as moldability, transparency and heat resistance from the standpoint of resin crystallizability.

The "lactone" as used herein means one having an intramolecularly cyclized ester structure. Specific examples of such a lactone include ε-caprolactone, α,α-dimethyl-β-propiolactone, dodecanolactone, D-propiolactone, butyrolactone, valerolactone, 3-alkylvalerolactone, 6,6-dialkylvalerolactone,. lactone of hydroxycyclohexanecarboxylic acid, isocoumarine, coumarine, hydroxycoumarine, and phthalide.

These lactones may be singly subjected to ring-opening polymerization to prepare a biodegradable polyester polymer. These lactones may be copolymerized with the foregoing intermolecularly cyclized esters.

In this case, the polymerization ratio of intermolecularly cyclized ester and lactone can vary depending on the desired polymer. The polymer can be provided with desirable properties by properly selecting the combination of intermolecularly cyclized ester and lactone.

For example, a copolymer of dilactide with ε-caprolactone or diglycolide is excellent in toughness and flexibility and thus can be formed into an unstretched film. Further, a copolymer of dilactide with coumarine is advantageous in that it has an excellent thermal stability. In general, for the purpose of obtaining a transparent resin, a dilactide copolymer is preferred. In this case, the polymerization proportion of dilactide to other monomers is preferably 1 or more.

In the present invention, one or more intermolecularly cyclized esters and one or more polymers having hydroxyl group and/or ester bond are subjected to copolymerization to prepare a biodegradable polyester polymer. Examples of the polymer having hydroxyl group include polyvinyl alcohol, starch, cellulose, and cellulose ether. If these compounds are used, a polymer similar to graft polymer can be easily obtained. Polyoxyalkylene ethers can easily provide a polymer similar to block polymer.

Examples of the polymer having ester bond include polyvinyl acetate, vinyl acetate/ethylene copolymer, and polycarbonate. Examples of the polymer having hydroxyl group and ester bond include cellulose ester, and polyester.

In the present invention, one or more such polymers or a mixture thereof may be used without any restriction. Polymers having a relatively large molecular weight are preferred. In some detail, polymers having a weight-average molecular weight of 5,000 to 300,000, preferably 5,000 to 200,000, and a melting point of not higher than 200° C. are preferred, From the standpoint of compatibility, cellulose esters having hydroxyl groups esterified in a proportion of 43 to 65% are preferred. For vinyl acetate/ethylene copolymers, the molar proportion of vinyl acetate/ethylene is preferably not less than 60/40. For polyesters, those having a melting point of not higher than 200° C. and a molecular weight of not less than 10,000 are preferred.

The reaction mechanism of the copolymerization of intermolecularly cyclized ester and polymer having hydroxyl group and/or ester bond is complicated. It is thought that the ring-opening polymerization of cyclic ester prevails in the initial reaction stage, and, after the production of an oligomer of cyclic ester, the cyclic ester then undergoes an ester exchange reaction with a polymer having hydroxyl group and/or ester bond to produce a copolymer.

Further, if a dilactide is used as a cyclic ester in a copolymerization ratio of 1 or more, a transparent resin can be obtained.

Examples of polymerization catalyst employable in the present invention include titanium compounds such as titanium chloride, tetrabutyl titanate, tetrapropyl titanate, and tetraethyl titanate, tin compounds such as stannous chloride, stannous bromide, stannous iodide and tin 2-ethylhexanoate, zinc compounds such as zinc chloride, zinc acetate, zinc stearate, zinc oxide, zinc carbonate, basic zinc carbonate and diethyl zinc, aluminum compounds, magnesium compounds, barium compounds, zirconium compounds, and germanium compounds. These polymerization catalysts may be used singly or in combination. The amount of such a polymerization catalyst to be added is normally in the range of 0.001 to 1.0 wt. %, preferably 0.01 to 0.1 wt. %.

The proportion of the copolymerizable components in the reaction depends on the required properties of the desired copolymerized polymer. In the copolymerization of intermolecularly cyclized ester (A) and lactone (B), ratio is normally from 99/1 to 1/99, preferably from 98/2 to 50/50, more preferably from 95/5 to 75/25. In the copolymerization of dilactide (A) and diglycolide (B), A/B ratio is normally from 99/1 to 1/99, preferably from 98/2 to 50/50, more preferably from 95/5 to 75/25. In the copolymerization of dilactide (A) and diglycolide (B), A/B polymer having hydroxyl group and/or ester bond (B), A/B ratio is normally from 99/1 to 1/99, preferably from 98/2 to 50/50, more preferably from 95/5 to 75/25.

The melt viscosity of the polymer obtained by the copolymerization of intermolecularly cyclized ester (A) and lactone (B) depends on the weight-average molecular weight and A/B ratio of the resulting polymer. In general, a polymer product having a weight-average molecular weight of 20,000 to 80,000 has a melt viscosity of 5,000 to 50,000 poise at a temperature of 180° C. A polymer product having a weight-average molecular weight of 80,000 to 500,000 has a melt viscosity of 20,000 to 200,000 poise at a temperature of 180° C. The more the proportion of lactone (B) is, the lower is the viscosity of the polymer product.

The retention time (reaction time) during which a dilactide as intermolecularly cyclized ester (A) and a lactone (B) are subjected to continuous reaction at a conversion of 85% in the continuous reaction apparatus according to the present invention depends on the kind of the lactone (B). In the case where a polymer product having a weight-average molecular weight of 20,000 to 80,000 is obtained, it is normally between 2 hours and 8 hours at a reaction temperature of 150° to 185° C. and a maximum system reaction pressure of 2 to 10 Kg/cm$^2$. In the case where a polymer product having a weight-average molecular weight of 80,000 to 500,000 is obtained, it is normally between 3 hours and 10 hours at a reaction temperature of 150° to 185° C. and a maximum system reaction pressure of 3 to 15 Kg/cm$^2$.

The retention time (reaction time) during which a diglycolide as intermolecularly cyclized ester (A) and a lactone (B) are subjected to continuous reaction at a conversion of 85% depends on the kind of the lactone (B). In the case where a polymer product having a weight-average molecular weight of 20,000 to 80,000 is obtained, it is normally between 2 hours and 8 hours at a reaction temperature of 155° to 230° C. and a maximum system reaction pressure of 2 to 10 Kg/cm². In the case where a polymer product having a weight-average molecular weight of 80,000 to 500,000 is obtained, it is normally between 3 hours and 10 hours at a reaction temperature of 155° to 230° C. and a maximum system reaction pressure of 3 to 15 Kg/cm².

The temperature at which the polymerization reaction according to the present invention is effected depends on the properties and combination of intermolecularly cyclized ester, lactone and polymer having hydroxyl group and/or ester bond used. It is normally from 120° C. to 200° C. For example, in the case where the intermolecularly cyclized ester (A) is dilactide, methyl glycolide or ethyl glycolide, the temperature at which the reaction with lactone (B) is effected is normally from 125° C. to 200° C., preferably from 145° C. to 195° C., more preferably from 150° C. to 185° C.

In the case where the intermolecularly cyclized ester (A) is diglycolide, $\alpha,\alpha$-dimethyl glycolide, trimethyl glycolide or tetramethyl glycolide, the temperature at which the reaction with lactone (B) is effected is normally from 125° C. to 270° C., preferably from 145° C. to 260° C., more preferably from 155° C. to 230° C. The temperature at which the reaction of dilactide with diglycolide is effected is normally from 125° C. to 270° C., preferably 145° C. to 260° C., more preferably from 155° C. to 230° C.

The melt viscosity of the polymer obtained by the copolymerization of dilactide and diglycolide depends on the constitution ratio of the two components and the weight-average molecular weight. In general, a polymer product having a weight-average molecular weight of 20,000 to 80,000 has a melt viscosity of 5,000 to 50,000 poise at a temperature of 180° C. A polymer product having a weight-average molecular weight of 80,000 to 500,000 has a melt viscosity of 20,000 to 200,000 poise at a temperature of 180° C. The more the proportion of diglycolide is, the lower is the viscosity of the polymer product.

The retention time (reaction time) during which a dilactide and a diglycolide are subjected to continuous reaction at a conversion of 85% is from 2 hours to 8 hours at a reaction temperature of 155° to 230° C. and a maximum system reaction pressure of 2 to 10 Kg/cm² in the case where a polymer product having a weight-average molecular weight of 20,000 to 80,000 is obtained. It is normally between 3 hours and 10 hours at a reaction temperature of 155° to 230° C. and a maximum system reaction pressure of 3 to 15 Kg/cm² in the case where a polymer product having a weight-average molecular weight of 80,000 to 500,000 is obtained.

The temperature at which one or more lactones are subjected to copolymerization reaction is normally from 125° C. to 290° C., preferably from 145° C. to 280° C., more preferably from 155° C. to 250° C.

The melt viscosity of the polymer obtained by the copolymerization of one or more lactones depends on the kind and lactone used and the weight-average molecular weight of the resulting polymer product. In general, a polymer product having a weight-average molecular weight of 10,000 to 80,000 has a melt viscosity of 2,000 to 20,000 poise at a temperature of 180° C. A polymer having a weight-average molecular weight of 80,000 to 500,000 has a melt viscosity of 5,000 to 100,000 poise at a temperature of 180° C.

The retention time (reaction time) during which one or more lactones are subjected to continuous reaction at a conversion of 85% is normally from 2 hours to 8 hours at a reaction temperature of 155° to 250° C. and a maximum system reaction pressure of 2 to 10 Kg/cm² in the case where a polymer product having a weight-average molecular weight of 20,000 to 80,000 is obtained. In the case where a polymer product having a weight-average molecular weight of 80,000 to 500,000 is obtained, it is from 3 hours to 10 hours at a reaction temperature of 155° to 250° C. and a maximum system reaction pressure of 3 to 15 Kg/cm².

The temperature at which the copolymerization reaction of intermolecularly cyclized ester (A) with polymer having hydroxyl group and/or ester bond (B) is effected is normally from 125° C. to 200° C., preferably from 145° C. to 195° C., more preferably from 150° C. to 185° C., if the intermolecularly cyclized ester (A) is a dilactide, methyl glycolide, ethyl glycolide, diglycolide, $\alpha,\alpha$-dimethyl glycolide, trimethyl glycolide or tetramethyl glycolide and the polymer having hydroxyl group and/or ester bond (B) is a cellulose ester, cellulose ether or polyoxyalkylene ether.

If the intermolecularly cyclized ester (A) is a dilactide, methyl glycolide or ethyl glycolide and the polymer having hydroxyl group and/or ester bond (B) is a cellulose, polyvinyl alcohol, polyvinyl acetate, vinyl acetate/ethylene copolymer, aromatic polyester, aliphatic polyester or polycarbonate, the reaction temperature is normally from 125° C. to 200° C., preferably from 145° C. to 195° C., more preferably from 150° C. to 185° C.

If the intermolecularly cyclized ester (A) is a diglycolide, $\alpha,\alpha$-dimethyl glycolide, trimethyl glycolide or tetramethyl glycolide and the polymer having hydroxyl group and/or ester bond (B) is a cellulose, polyvinyl alcohol, polyvinyl acetate, vinyl acetate/ethylene copolymer, aromatic polyester, aliphatic polyester or polycarbonate, the reaction temperature is normally from 125° C. to 270° C., preferably from 145° C. to 260° C., more preferably from 155° C. to 230° C.

The melt viscosity of the polymer obtained by the copolymerization of intermolecularly cyclized ester (A) and polymer having hydroxyl group and/or ester bond (B) depends on the weight-average molecular weight and A/B ratio of the resulting polymer. In general, if the polymer (B) has a molecular weight of not less than 10,000 and a melt viscosity of not less than 10,000 at a temperature of 180° C., a polymer product having a weight-average molecular weight of 20,000 to 80,000 has a melt viscosity of 5,000 to 50,000 poise at a temperature of 180° C. A polymer product having a weight-average molecular weight of 80,000 to 500,000 has a melt viscosity of 20,000 to 200,000 poise at a temperature of 180° C.

The retention time (reaction time) during which a dilactide as intermolecularly cyclized ester (A) and a polymer having hydroxyl group and/or ester bond (B) are subjected to continuous reaction at a conversion of 85% is normally between 2 hours and 8 hours at a reaction temperature of 155° to 185° C. and a maximum system reaction pressure of 2 to 10 Kg/cm² in the case where a polymer product having a weight-average molecular weight of 20,000 to 80,000 is obtained. If a polymer product having a weight-average molecular weight of 80,000 to 500,000 is obtained, it is normally between 3 hours and 10 hours at a reaction temperature of 150° to 185° C. and a maximum system reaction pressure of 3 to 15 Kg/cm².

The retention time (reaction time) during which a diglycolide as intermolecularly cyclized ester (A) and a polymer having hydroxyl group and/or ester bond (B) are subjected to continuous reaction at a conversion of 85% is normally between 2 hours and 8 hours at a reaction temperature of 155° to 230° C. and a maximum system reaction pressure of 2 to 10 Kg/cm$^2$ in the case where a polymer product having a weight-average molecular weight of 20,000 to 80,000 is obtained. If a polymer product having a weight-average molecular weight of 80,000 to 500,000 is obtained, it is normally between 3 hours and 10 hours at a reaction temperature of 155° to 230° C. and a maximum system reaction pressure of 3 to 15 Kg/cm$^2$.

The maximum reaction pressure in the system as defined above is determined free of solvent. In the case where the reaction system comprises a solvent and the viscosity of the reaction system is adjusted to not more than 50,000 poise, the maximum reaction pressure in the system can be reduced, normally to not more than 10 Kg/cm$^2$. The reaction apparatus is preferably designed such that the maximum allowable reaction pressure is from 2 to 15 Kg/cm$^2$ and the retention time is between 1 hour and 8 hours from the standpoint of safety.

In the present invention, a molecular weight modifier (chain transfer agent) such as water, lactic acid, glycolic acid and other alcohols and carboxylic acids can be incorporated in the system in an amount up to 0.1% depending on the purpose to obtain a polymer having a low molecular weight. Further, other common polymer additives such as oxidation inhibitor, ultraviolet absorbent and plasticizer may be used in the present invention without any restriction. These additives may be added to the reaction system in the form of solution in a solvent in the course of reaction.

During the continuous reaction, isocyanates, acid anhydrides, compounds having epoxy group, etc., not to mention the foregoing copolymerizable components, may be additionally added to the reaction system to improve the properties of the resulting polymer.

As mentioned above, the present invention can provide a process for the continuous production of a biodegradable polyester polymer having a melt viscosity of not more than 500,000 poise and a weight-average molecular weight of not less than 10,000, which comprises continuously supplying monomers or polymers selected from the group consisting of intermolecularly cyclized ester of hydroxycarboxylic acid, lactone, and polymer having hydroxyl group and/or ester bond into a continuous reaction apparatus equipped with a static mixer where the reactants are subjected to continuous polymerization reaction at a polymerization temperature of 125° to 270° C., a maximum system reaction pressure of 2 to 15 Kg/cm$^2$ and a conversion (one pass) of not less than 85% in the presence or absence of solvent without coming into contact with oxygen and water in the atmosphere, and then subjected to devolatilization to remove and recover residual monomers and solvent for reuse.

The present invention will be further described in the following examples, but the present invention should not be construed as being limited thereto.

The terms "%" and "parts" as used hereinafter indicate % by weight and parts by weight, respectively, unless otherwise specified.

EXAMPLE 1

In the present example, a continuous polymerization apparatus comprising a series combination of four units of static mixer having an inner diameter of ½ in. and a length of 60 cm (Kenics static mixer with 24 mixing elements available from Noritake Co., Ltd.) and a series combination of four units of static mixer having an inner diameter of ¾ in. and a length of 50 cm (static mixer with 15 mixing elements available from Noritake Co., Ltd.) connected in series with each other was used.

A catalyst was supplied by a catalyst supply pump into a static mixer having an inner diameter of ¼ in. and a length of 15.5 cm (static mixer with 12 mixing elements available from Noritake Co., Ltd.) where it was then mixed with a main starting material immediately before a main starting material supply pump.

95 parts of L-dilactide and 5 parts of ε-caprolactone were charged into a starting material supply tank where they were then heated in an atmosphere of nitrogen gas to dissolve L-dilactide. Thus, a starting material solution was prepared. As the catalyst there was used 0.02 part of tin 2-ethylhexanoate. Under the following conditions, the starting material was continuously supplied into the continuous polymerization apparatus for mass polymerization.
Supply flow rate of main starting material: 250 ml/hr.
Supply flow rate of catalyst: 0.5 ml/hr.
Reaction temperature: 165° C.

The resulting polymer was pelletized to determine various properties and physical properties. The results are set forth in Table 1.

EXAMPLE 2

The polymerization of the present invention was conducted in the same manner as in Example 1 except that 85 parts of L-dilactide and 15 parts of ε-caprolactone were used as components to be incorporated in the main starting material solution to be prepared in an atmosphere of nitrogen gas and 0.03 part of stannous chloride was used as a catalyst. The resulting resin was pelletized to determine various properties and physical properties. The results are set forth in Table 1.

EXAMPLE 3

The polymerization of the present invention was conducted in the same manner as in Example 1 except that 90 parts of L-dilactide and 10 parts of coumarine were used as components to be incorporated in the main starting material solution to be prepared in an atmosphere of nitrogen gas and 0.03 part of stannous chloride was used as a catalyst. The resulting resin was pelletized to determine various properties and physical properties. The results are set forth in Table 1.

EXAMPLE 4

A continuous polymerization apparatus having a polymerization zone comprising a circulation polymerization line having a series combination of four units of static mixer with an inner diameter of 0.5 in. and a length of 60 cm equipped with a circulation gear pump and a polymerization line having a series combination of four units of static mixer with an inner diameter of ¾ in. and a length of 50 cm (static mixer with 15 mixing elements available from Noritake Co., Ltd.) connected in series with the circulation polymerization line was used.

As components to be incorporated in the starting material solution which was to be prepared in an atmosphere of nitrogen gas, there were used 85 parts of L-dilactide, 5 parts of D-dilactide and 10 parts of an aliphatic polyester resin made of succinic acid and ethylene glycol (weight-average molecular weight: 70,000). As a catalyst, there was used 0.04 part of tetraisopropyl titanate. Under the following conditions, these components were subjected to continuous polymerization.
Supply flow rate of starting material: 400 ml/hr.
Supply flow rate of catalyst: 1.6 ml/hr.
Reaction temperature: 175° C.
Rate of flow circulated in circulation polymerization line: 2 l/hr.
Reflux ratio: 5

The resulting polymer was then pelletized in the same manner as in Example 1 to determine various properties and physical properties. The results are set forth in Table 1.

EXAMPLE 5

A continuous polymerization apparatus having such an arrangement that a polymerization solution can be continuously supplied from a first reaction vessel (21) equipped with anchor agitating blades at its bottom discharge port into the continuous polymerization apparatus of Example 1 by means of a gear pump was used.

As components to be incorporated in the starting material solution which was to be prepared in an atmosphere of nitrogen gas, there were used 85 parts of L-dilactide, 5 parts of MESO-dilactide and 10 parts of a polyethylene terephthalate (weight-average molecular weight: 6,000; melting point: 86° C.). As a catalyst, there was used 0.03 part of tin 2-ethylhexanoate. Under the following conditions, these components were subjected to polymerization.
Supply flow rate of starting material: 500 ml/hr.
Supply flow rate of catalyst: 1.5 ml/hr.
Retention solution volume in first reaction vessel: 500 ml
Reaction temperature in first reaction vessel: 160° C.

The resulting resin was then pelletized in the same manner as in Example 1 to determine various properties and physical properties. The results are set forth in Table 1.

EXAMPLE 6

Polymerization was effected in the same manner as in Example 5 except that 15 parts of toluene, 79 parts of L-dilactide, 2 parts of D-dilactide, and 4 parts of a polyester resin made of terephthalic acid, isophthalic acid, adipic acid, ethylene glycol and neopentyl glycol (weight-average molecular weight: 30,000) were used as components to be incorporated in the starting material solution to be prepared in an atmosphere of nitrogen gas. The resulting polymerization solution was then subjected to devolatilization in an apparatus comprising a heat exchanger and a devolatilizer. The temperature in the heat exchanger, which was positioned before the devolatilizer, was 200° C. The degree of vacuum in the devolatilizer was 10 Torr. The resulting resin was then pelletized to determine various properties and various physical properties. The results are set forth in Table 1.

EXAMPLE 7

Polymerization was conducted in the same manner as in Example 1 except that 90 parts of L-dilactide and 10 parts of a polyethylene glycol (weight-average molecular weight: 200,000) were used as components to be incorporated in the main starting material solution to be prepared in an atmosphere of nitrogen gas. The resulting polymer was pelletized to determine various properties and physical properties. The results are set forth in Table 1.

EXAMPLE 8

Polymerization was conducted in the same manner as in Example 1 except that 90 parts of ε-caprolactone and 10 parts of δ-valerolactone were used as components to be incorporated in the main starting material solution to be prepared in an atmosphere of nitrogen gas and tin 2-ethylhexanoate was used as a catalyst. The resulting polymer was pelletized to determine various properties and physical properties. The results are set forth in Table 1.

EXAMPLE 9

In the present example, a continuous polymerization apparatus comprising a series combination of four units of static mixer having an inner diameter of ½ in. and a length of 60 cm (Kenics static mixer with 24 mixing elements available from Noritake Co., Ltd.) and a series combination of four units of static mixer having an inner diameter of ¾ in. and a length of 50 cm (static mixer with 15 mixing elements available from Noritake Co., Ltd.) connected in series with each other was used. A catalyst was supplied by a catalyst supply pump into a static mixer having an inner diameter of ¼ in. and a length of 15.5 cm (static mixer with 12 mixing elements available from Noritake Co., Ltd.) where it was then mixed with a main starting material immediately before a main starting material supply pump.

15 parts of toluene, 79 parts of L-dilactide, 2 parts of D-dilactide, and 4 parts of a polyester resin made of terephthalic acid, isophthalic acid, adipic acid, ethylene glycol and neopentyl glycol (weight-average molecular weight: 30,000) were used as components to be incorporated in a starting material solution to be prepared in an atmosphere of nitrogen gas. As the catalyst, there was used 0.02 part of tin 2-ethylhexanoate.. The resulting polymerization solution was then subjected to devolatilization in an apparatus comprising a heat exchanger and a devolatilizer.
Supply flow rate of main starting material: 250 ml/hr.
Supply flow rate of catalyst: 0.8 ml/hr.
Reaction temperature: 185° C.

The temperature in the heat exchanger, which was positioned before the devolatilizer, was 205° C. The degree of vacuum in the devolatilizer was 9 Torr. The resulting resin was then pelletized to determine various properties and various physical properties. The results are set forth in Table 1.

COMPARATIVE EXAMPLE 1

A 10-l reaction tank equipped with helical agitating blades was used to effect polymerization reaction. The composition of the starting material solution and the reaction temperature were the same as used in Example 1. The polymerization reaction was allowed to proceed for 6 hours. The resulting polymer was sampled from various zones in the reaction tank to determine various properties and physical properties. The results are set forth in Table 2.

COMPARATIVE EXAMPLE 2

A 10-l reaction tank equipped with anchor agitating blades instead of helical agitating blades was used to effect polymerization reaction. The composition of the starting material solution and the reaction temperature were the same as used in Example 2. The polymerization reaction was allowed to proceed for 6 hours. The resulting polymer was sampled from various zones in the reaction tank to determine various properties and physical properties. The results are set forth in Table 2.

The percent residual monomer content (%), number-average molecular weight (Mn) and weight-average molecular weight (Mw) set forth in these tables were determined by GPC process. The melting point set forth in these tables was determined by differential scanning calorimetry (Dec) process.

A, B and C zones of comparative examples set forth in Table 2 were upper layer, middle layer and lower layer in the reaction tank, respectively. Table 2 shows the results of analysis of specimens sampled from these zones.

These tables show that the examples of the present invention provide a continuous production of a polymer having an extremely excellent homogeneity while the comparative examples give a polymer having remarkable variations of properties and physical properties even in the same reaction vessel.

TABLE 1

| | Example | | | | | | | | |
|---|---|---|---|---|---|---|---|---|---|
| | 1 | 2 | 3 | 4 | 5 | 6 | 7 | 8 | 9 |
| Appearance | | | | | | | | | |
| Color | None | None | None | None | None | None | None | White | None |
| Transparency | Yes | Yes | Yes | Yes | Yes | Yes | Yes | No | Yes |
| % Residual monomer | 6.8 | 5.1 | 6.8 | 4.6 | 2.8 | 0.5 | 11.6 | 1.4 | 3.2 |
| Mn (× 1000) | 152 | 93 | 160 | 90 | 104 | 99 | 76 | 46 | 104 |
| Mw (× 1000) | 255 | 186 | 284 | 162 | 220 | 178 | 142 | 82 | 170 |
| m.p. (°C.) | 162 | 148 | 165 | 166 | 172 | 168 | 164 | 52 | 165 |
| Viscosity (× 1000 poise) | 46 | 43 | 46 | 42 | 53 | 56 | 25 | 10 | 47 |

(Note: Viscosity is determined at 180° C.)

TABLE 2

| | Comparative Example | | | | | |
|---|---|---|---|---|---|---|
| | 1 | | | 2 | | |
| | A zone | B zone | C zone | A zone | B zone | C zone |
| Appearance | | | | | | |
| Color | Colorless | Yellowish | Colorless | Yellowish | Yellowish | Colorless |
| Transparency | Yes | Yes | Yes | Yes | Slightly turbid | Yes |
| % Residual monomer | 5.3 | 4.0 | 3.1 | 10.2 | 3.5 | 3.0 |
| Mn (× 1000) | 114 | 105 | 123 | 77 | 72 | 95 |
| Mw (× 1000) | 205 | 170 | 244 | 152 | 137 | 197 |
| m.p. (°C.) | 165 | 175 | 162 | 160 | 167 | 168 |

As mentioned above, the present invention provides process for the continuous production of a biodegradable polyester polymer with an excellent quality useful in the field of medicine, coating material and packaging material by eliminating difficulty in uniform agitation and heat removal caused by the rise in the viscosity of reactants in the production of a high molecular biodegradable polyester polymer by ring-opening polymerization.

While the invention has been described in detail and with reference to specific embodiments thereof, it will be apparent to one skilled in the art that various changes and modifications can be made therein without departing from the spirit and scope thereof.

What is claimed is:

1. A process for the continuous production of a biodegradable polyester polymer, which comprises continuously supplying polymerizable components consisting essentially of intermolecularly cyclized esters of hydroxycarboxylic acid and one or more lactone into a continuous reaction apparatus equipped with a static mixer wherein the polymerizable components are subjected to ring-opening polymerization at a temperature of 125° to 270° C., and continuously withdrawing the reaction product from the end of the polymerization line in the continuous reaction apparatus, wherein said polymerizable components are supplied in the form of a melt or a solution in a solvent prepared in an atmosphere of an inert gas, and said static mixer comprises mixing elements fixed in a pipe through which a solution flow is axially and crosswise split, diverted or inverted so that the solution is stirred, said mixing elements being free of mobile portions.

2. The process according to claim 1, wherein said reaction is effected with a solvent in an amount of not more than 20 parts by weight based on 100 parts by weight of polymerizable components.

3. The process according to claim 1, wherein said intermolecularly cyclized ester of hydroxycarboxylic acid is a dilactide and/or diglycolide.

4. The process according to any one of claims 1 to 3, wherein said polymerization is preliminarily carried out in a starring reaction vessel equipped with an agitator, and then in the continuous reaction apparatus equipped with a static mixer.

5. The process according to any one of claims 1 to 3, wherein said polymerization is carried out in a loop continuous reaction apparatus equipped with a static mixer so that the reactants are circulated.

6. The process according to any one of claims 1 to 3, wherein said polymerization in the continuous reaction apparatus equipped with a static mixer is followed by the removal and recovery of residual monomers and/or solvents from the resulting polymer in a devolatilizer connected to the continuous reaction apparatus equipped with a static mixer, whereby the monomers and solvents thus recovered can be re-used.

7. A process for the continuous production of a biodegradable polyester polymer, which comprises continuously supplying polymerizable components consisting essentially of a dilactide and a diglycolide into a continuous reaction apparatus equipped with a static mixer wherein the dilactide and diglycolide are subjected to ring-opening polymerization at a temperature of 125° to 270° C., and continuously withdrawing the reaction product from the end of the polymerization line in the continuous reaction apparatus, wherein said dilactide and diglycolide are supplied in the form of a melt or a solution in a solvent prepared in an atmosphere of an inert gas, and said static mixer comprises mixing elements fixed in a pipe through which a solution flow is axially and crosswise split, diverted or inverted so that the solution is stirred, said mixing elements being free of mobile portions.

8. The process according to claim 7, wherein said reaction is effected with a solvent in an amount of not more than 20 parts by weight based on 100 parts by weight of polymerizable components.

9. The process according to claim 7, wherein said polymerization is preliminarily carried out in a stirring reaction vessel equipped with an agitator, and then in the continuous reaction apparatus equipped with a static mixer.

10. The process according to any one of claims 7 to 9, wherein said polymerization is carried out in a loop continuous reaction apparatus equipped with a static mixer so that the reactants are circulated.

11. The process according to any one of claims 7 to 10, wherein said polymerization in the continuous reaction apparatus equipped with a static mixer is followed by the removal and recovery of residual monomers and/or solvents from the resulting polymer in a devolatilizer connected to the continuous reaction apparatus equipped with a static mixer, whereby the monomers and solvents thus recovered can be re-used.

12. A process for the continuous production of a biodegradable polyester polymer, which comprises continuously supplying polymerizable components consisting essentially of one or more intermolecularly cyclized ester of hydroxycarboxylic acid and one or more polymer having a hydroxyl group and/or an ester bond into a continuous reaction apparatus equipped with a static mixer wherein the polymerizable components are subjected to ring-opening polymerization at a temperature of 125° to 270° C., and continuously withdrawing the reaction product from the end of the polymerization line in the continuous reaction apparatus, wherein said polymerizable components are supplied in the form of a melt or a solution in a solvent prepared in an atmosphere of an inert gas, and said static mixer comprises mixing elements fixed in a pipe through which a solution flow is axially and crosswise split, diverted or inverted so that the solution is stirred, said mixing elements being free of mobile portions.

13. The process according to claim 12, wherein said reaction is effected with a solvent in an amount of not more than 20 parts by weight based on 100 parts by weight of polymerizable components.

14. The process according to claim 12, wherein said intermolecularly cyclized ester of hydroxycarboxylic acid is a dilactide and/or diglycolide.

15. The process according to any one of claims 12 to 14, wherein said polymerization is preliminarily carried out in a stirring reaction vessel equipped with an agitator, and then in the continuous reaction apparatus equipped with a static mixer.

16. The process according to any one of claims 12 to 14, wherein said polymerization is carried out in a loop continuous reaction apparatus equipped with a static mixer so that the reactants are circulated.

17. The process according to any one of claims 12 to 14, wherein said polymerization in the continuous reaction apparatus equipped with a static mixer is followed by the removal and recovery of residual monomers and/or solvents from the resulting polymer in a devolatilizer connected to the continuous reaction apparatus equipped with a static mixer, whereby the monomers and solvents thus recovered can be re-used.

\* \* \* \* \*